United States Patent
Ohba et al.

(10) Patent No.: US 9,373,308 B2
(45) Date of Patent: Jun. 21, 2016

(54) MULTI-VIEWPORT DISPLAY OF MULTI-RESOLUTION HIERARCHICAL IMAGE

(71) Applicant: Sony Computer Entertainment Inc., Tokyo (JP)

(72) Inventors: Akio Ohba, Kanagawa (JP); Tetsugo Inada, Kanagawa (JP); Hiroyuki Segawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 156 days.

(21) Appl. No.: 14/360,969

(22) PCT Filed: Oct. 24, 2012

(86) PCT No.: PCT/JP2012/006821
§ 371 (c)(1),
(2) Date: May 28, 2014

(87) PCT Pub. No.: WO2013/084401
PCT Pub. Date: Jun. 13, 2013

(65) Prior Publication Data
US 2015/0123993 A1    May 7, 2015

(30) Foreign Application Priority Data
Dec. 9, 2011   (JP) ................................ 2011-270561

(51) Int. Cl.
*G09G 5/377*    (2006.01)
*G09G 5/00*     (2006.01)
(Continued)

(52) U.S. Cl.
CPC .............. *G09G 5/377* (2013.01); *G06F 3/0485* (2013.01); *G09G 5/00* (2013.01); *G09G 5/14* (2013.01);
(Continued)

(58) Field of Classification Search
None
See application file for complete search history.

(56) References Cited

U.S. PATENT DOCUMENTS 6,563,999 B1    5/2003    Suzuoki
6,587,118 B1    7/2003    Yoneda
(Continued)

FOREIGN PATENT DOCUMENTS

EP    0933694 A1    8/1999
EP    1681656 A1    7/2006
(Continued)

OTHER PUBLICATIONS

International Preliminary Report on Patentability and Written Opinion for corresponding PCT Application No. PCT/JP2012/006821, dated Jun. 19, 2014.
Search Report for corresponding EP Application No. 12856159.4 dated Jul. 30, 2015.
Office Action for corresponding JP Application No. 2011-270561, dated Jan. 27, 2015.
International Search Report for corresponding PCT Application No. PCT/JP2012/006821, dated Jan. 29, 2013.

*Primary Examiner* — Edward Martello
(74) *Attorney, Agent, or Firm* — Matthew B. Dernier, Esq.

(57) ABSTRACT

An input information obtaining portion of a control section obtains requests input from an input device by a user, which requests include a display region moving request to enlarge/reduce or scroll an image displayed on a display device and a request to generate/erase a viewport, change the size of a viewport, or move a viewport. A viewport control portion successively determines the number, arrangement, and size of viewports accordingly. A display region determining portion determines the region of an image to be displayed next in each viewport. A loading portion determines tile images to be newly loaded, and loads the data of the tile images from a hard disk drive. A decoding portion decodes the data of tile images used for rendering the image in each viewport. A display image processing portion updates the display region independently for each viewport.

10 Claims, 12 Drawing Sheets

(51) Int. Cl.
*G09G 5/14* (2006.01)
*G09G 5/36* (2006.01)
*G09G 5/38* (2006.01)
*G09G 5/391* (2006.01)
*G06F 3/0485* (2013.01)
*G09G 5/34* (2006.01)
*G09G 5/393* (2006.01)

(52) U.S. Cl.
CPC .. *G09G 5/36* (2013.01); *G09G 5/38* (2013.01); *G09G 5/391* (2013.01); *G06F 2203/04806* (2013.01); *G09G 5/34* (2013.01); *G09G 5/393* (2013.01); *G09G 2340/02* (2013.01); *G09G 2340/045* (2013.01); *G09G 2340/0407* (2013.01); *G09G 2340/12* (2013.01); *G09G 2350/00* (2013.01)

(56) References Cited

U.S. PATENT DOCUMENTS

| | | |
|---|---|---|
| 6,760,048 B1 | 7/2004 | Bates |
| 7,543,241 B1 | 6/2009 | Brunk |
| 2009/0125839 A1 | 5/2009 | Kano |
| 2010/0007669 A1* | 1/2010 | Bethune .................. G06T 3/40 345/520 |

FOREIGN PATENT DOCUMENTS

| | | |
|---|---|---|
| JP | 11088866 A | 3/1999 |
| JP | 2002259077 A | 9/2002 |
| JP | 2003016035 A | 1/2003 |
| JP | 2009031862 A | 2/2009 |
| JP | 2010085779 A | 4/2010 |

* cited by examiner

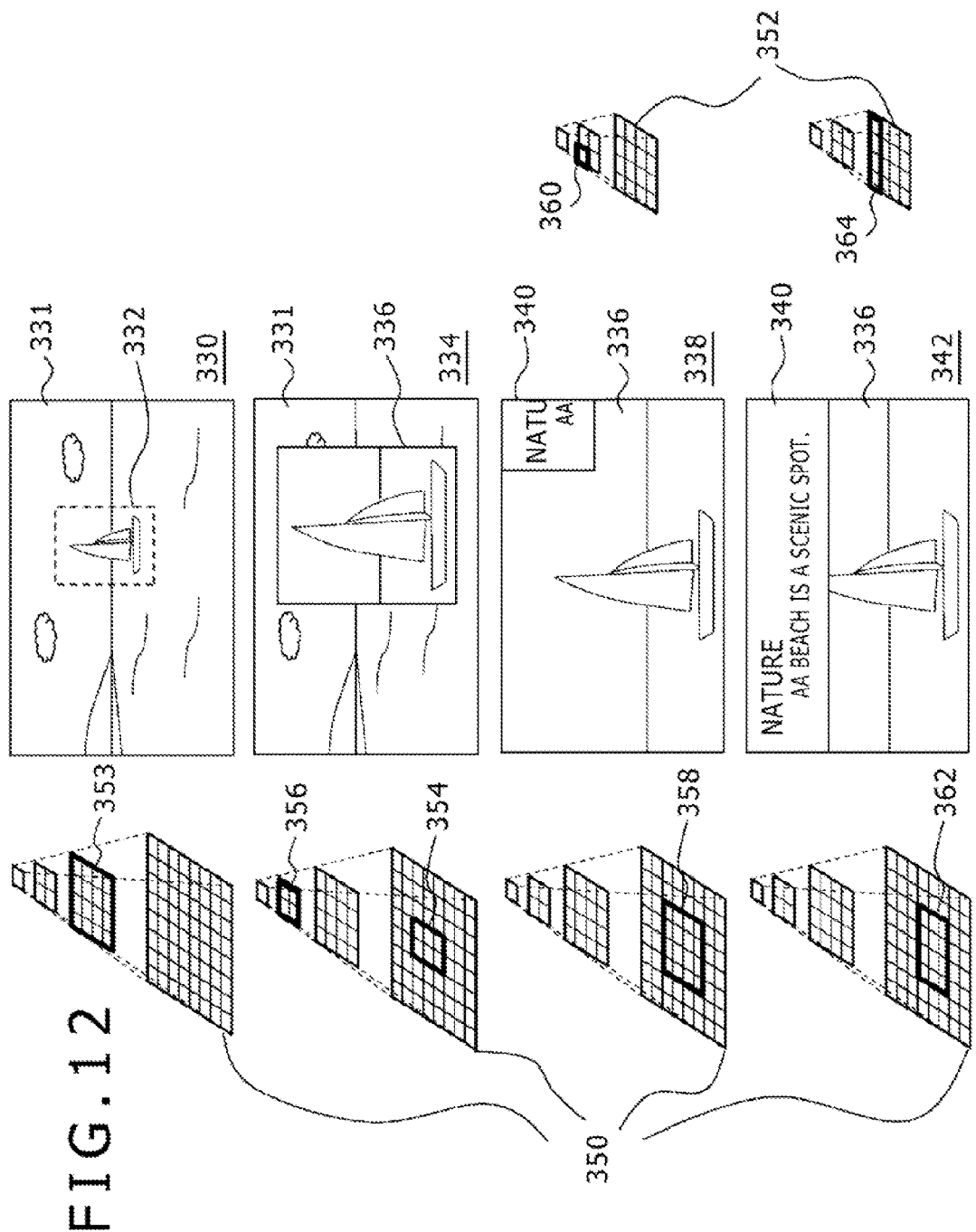

MULTI-VIEWPORT DISPLAY OF MULTI-RESOLUTION HIERARCHICAL IMAGE

TECHNICAL FIELD

The present invention relates to an image processing technology for changing the display region of an image and displaying the image on a display.

BACKGROUND ART

An entertainment system for home use has been proposed which can not only execute a game program but also reproduce a moving image. In the entertainment system for home use, a GPU generates three-dimensional images using polygons (see PTL 1, for example).

How to display an image efficiently is always an important problem irrespective of whether the image is a moving image or a still image. Therefore, various technologies have been developed and put to practical use in many fields, such as image data compression technology, transmission technology, image processing technology, display technology, and the like. Thus, high-definition images have become readily available in various situations.

CITATION LIST

Patent Literature

[PTL 1]
U.S. Pat. No. 6,563,999

SUMMARY

Technical Problem

There is always a desire to display a high-definition image with good responsiveness according to a request by a user. In order to update a display image with good responsiveness in response to a viewpoint moving request with a degree of freedom, such as a request to enlarge and display a region to which the user directs attention or move the display to another region in a displayed entire image, for example, the transfer, decoding, and rendering of image data in a random region needs to be completed within a limited time. Therefore, it is always a major problem to make image quality and responsiveness compatible with each other within limits of processing performance and resources of a device.

The present invention has been made in view of such problems. It is an object of the present invention to provide an image processing technology capable of displaying a high-definition image with good responsiveness in response to an operation related to a display region.

Solution to Problem

A mode of the present invention relates to an image processing device. The image processing device includes: an image data storage portion for storing hierarchical data formed by layering, in order of resolution, a plurality of pieces of image data representing a display object image with different resolutions; a viewport control portion for determining a layer and a region used for rendering an image to be displayed in each of a plurality of viewports generated on a screen of a display device, the layer and the region being included in the hierarchical data; a display region determining portion for independently updating the layer and the region used for rendering the image of a viewport of interest according to an input display region moving request signal; and a display image processing portion for reading data of the layer and the region determined by the viewport control portion or the display region determining portion from the image data storage portion, rendering the image of each viewport using the data, and making the image of each viewport displayed on the display device.

Another mode of the present invention relates to an image processing method. This image processing method includes: in an image processing device, a step of determining a layer and a region used for rendering an image to be displayed in each of a plurality of viewports generated on a screen of a display device, the layer and the region being included in hierarchical data formed by layering, in order of resolution, a plurality of pieces of image data representing a display object image with different resolutions; a step of reading data of the determined layer and the determined region from a storage device, rendering the image of each viewport using the data, and making the image of each viewport displayed on the display device; a step of independently updating the layer and the region used for rendering the image of a viewport of interest according to an input display region moving request signal; and a step of reading data of the layer and the region after the update from the storage device, and updating the image of the viewport of interest using the data.

It is to be noted that arbitrary combinations of the above constituent elements and modes realized by converting expressions of the present invention between a method, a device, a system, a computer program, and the like are also effective as modes of the present invention.

Advantageous Effect of Invention

According to the present invention, it is possible to display an image with good responsiveness in response to an instruction by a user while maintaining desired image quality.

BRIEF DESCRIPTION OF DRAWINGS

FIG. 12 is a diagram showing another screen example when a layer used for rendering is adjusted in the present embodiment.

DESCRIPTION OF EMBODIMENTS

Figure 1:
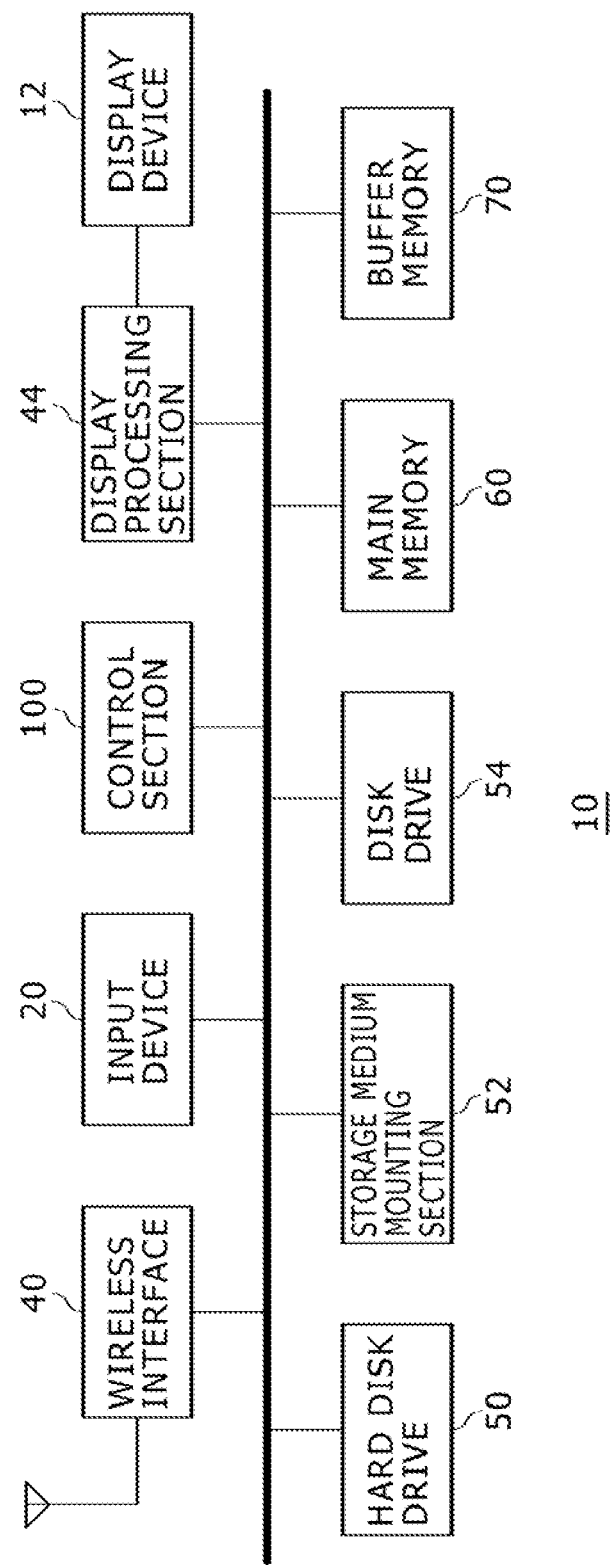
FIG. 1 is a diagram showing a configuration of an image processing device according to a present embodiment.

FIG. 1 shows a configuration of an image processing device according to a present embodiment. The image processing device 10 includes a wireless interface 40, an input device 20, a display processing section 44, a display device 12, a hard disk drive 50, a recording medium mounting section 52, a disk drive 54, a main memory 60, a buffer memory 70, and a control section 100.

The display device 12 includes one of ordinary displays such as a liquid crystal display, an EL (Electronic Luminescence) display, a plasma display, and the like. The display device 12 may be provided integrally with other modules of the image processing device 10, or may be connected to the other modules of the image processing device 10 by wired connection or radio connection by a wire cable or a wireless LAN (Local Area Network), for example. The display processing section 44 has a frame memory (not shown) for buffering data to be displayed on a display of the display device 12.

The wireless interface 40 is configured to be able to receive various kinds of data such as image data and the like from a server by being connected to an external device or a network by radio according to a predetermined wireless communication protocol. The input device 20 is formed by ordinary input devices such as a joystick, a touch panel, a mouse, a keyboard, buttons, and the like. The input device 20 at least includes input means for a user to input a display region moving request to enlarge/reduce an image displayed on the display device 12 or scroll an image displayed on the display device 12 in an upward, downward, left, or right direction, a request to generate/erase a viewport to be described later, change the size of a viewport, or move a viewport, and the like.

Various concrete operating methods for performing these inputs are conceivable according to the type of the input device 20 and a method of assigning functions to operating means included in the input device 20. For example, when a touch panel is used as the input device 20, a mode can be realized in which a finger in contact with a touch panel is shifted to thereby scroll a display image in a same direction, and the display image is enlarged or reduced by opening or closing two fingers. An ordinary technology is applicable to processing related to such operations, and therefore description thereof will be omitted as appropriate. Various kinds of request signals input from the user on the input device 20 are supplied to the control section 100.

The hard disk drive 50 functions as a storage device for storing data. The various kinds of data received from the server are stored on the hard disk drive 50. When a removable recording medium such as a memory card or the like is mounted on the recording medium mounting section 52, the recording medium mounting section 52 reads data from the removable recording medium. When a read-only ROM disk is mounted on the disk drive 54, the disk drive 54 drives and recognizes the ROM disk, and reads data from the ROM disk. The ROM disk may be an optical disk, a magneto-optical disk, or the like. Various kinds of data such as image data and the like may be stored on these recording media.

The control section 100 includes a multi-core CPU. The control section 100 has one general-purpose processor core and a plurality of simple processor cores within the one CPU. The general-purpose processor core is referred to as a PPU (PowerPC Processor Unit). The other processor cores are referred to as an SPU (Synergistic Processor Unit).

The control section 100 includes a memory controller connected to the main memory 60 and the buffer memory 70. The PPU has a register, and includes a main processor as an entity of operation execution. The PPU efficiently assigns tasks as basic units of processing in applications being executed to the respective SPUs. Incidentally, the PPU itself may execute a task. The SPUs have a register, and include a sub processor as an entity of operation execution and a local memory as a local storage region. The local memory may be used as the buffer memory 70.

The main memory 60 and the buffer memory 70 are storage devices, and are formed as RAMs (Random Access Memories). The SPUs have a dedicated DMA (Direct Memory Access) controller as a control unit, and enable high-speed data transfer between the main memory 60 and the buffer memory 70 and high-speed data transfer between the frame memory in the display processing section 44 and the buffer memory 70. The control section 100 according to the present embodiment implements a high-speed image processing function by operating a plurality of SPUs in parallel with each other. The display processing section 44 is connected to the display device 12, and outputs a result of image processing according to a request from the user.

The image processing device 10 according to the present embodiment loads a part of compressed image data from the hard disk drive 50 into the main memory 60 in advance in order to change a display image smoothly when performing display image enlarging/reducing processing and scrolling processing. In addition, a part of the compressed image data loaded in the main memory 60 is further decoded and stored in the buffer memory 70 in advance. This enables an image used in the generation of the display image to be changed instantly in subsequent necessary timing.

The data structure of the image set as a processing object in the present embodiment is not particularly limited. However, description in the following will be made by taking image data having a hierarchical structure as an example. The image data has a hierarchical structure including images of different resolutions which images are generated by reducing an original image in a plurality of stages. The image in each layer is divided into one or a plurality of tile images. For example, an image of a lowest resolution is formed by one tile image, and the original image of a highest resolution is formed by a largest number of tile images. At a time of image display, tile images used for rendering are changed to tile images in a different layer when the display image is changed to a predetermined resolution, and thereby enlarged display or reduced display is made quickly.

Figure 2:
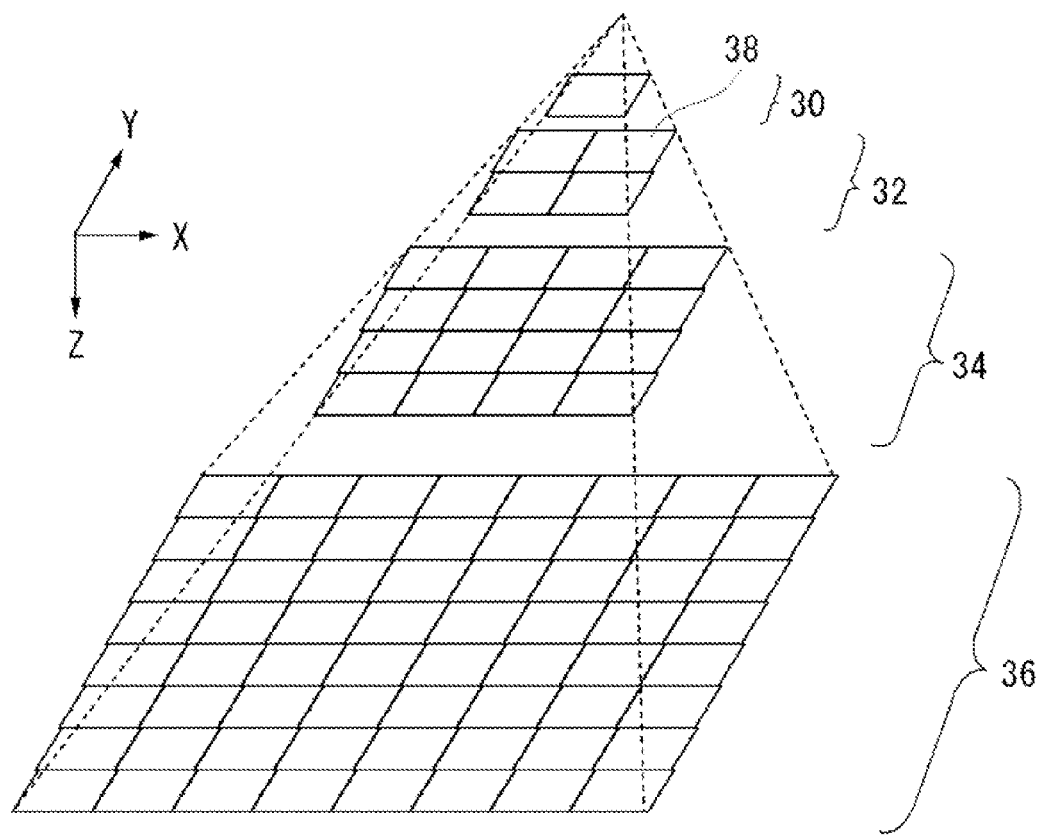
FIG. 2 is a conceptual diagram of the hierarchical structure of image data used in the present embodiment.

FIG. 2 is a conceptual diagram of the hierarchical structure of image data. The image data has a hierarchical structure including a zeroth layer 30, a first layer 32, a second layer 34, and a third layer 36 in a direction of depth (Z-axis). Incidentally, while only the four layers are shown in FIG. 2, the number of layers is not limited to this. The image data having such a hierarchical structure will hereinafter be referred to as "hierarchical data."

The hierarchical data shown in FIG. 2 has a quadtree hierarchical structure. Each layer is formed by one or more tile images 38. All of the tile images 38 are formed in an identical size having a same number of pixels, and for example have 256×256 pixels. Image data in each layer represents one image with a different resolution. Image data in the second layer 34, the first layer 32, and the zeroth layer 30 is generated by reducing the original image having the highest resolution in the third layer 36 in a plurality of stages. For example, the resolution of an Nth layer (N is an integer of zero or more) may be ½ of the resolution of an (N+1)th layer in both of a left-right (X-axis) direction and an upward-downward (Y-axis) direction.

In the image processing device 10, the hierarchical data is retained in the form of individual tile images 38 in the storage device in a state of being compressed in a predetermined compression format, and is read from the storage device and decoded before being displayed on the display. The image processing device 10 according to the present embodiment has a decoding function supporting a plurality of kinds of compression formats, and is capable of decoding compressed data in a JPEG format, a JPEG2000 format, a PNG format, and an S3TC format.

In the hierarchical structure of the hierarchical data, as shown in FIG. 2, a virtual three-dimensional space is constructed with the left-right direction set as an X-axis, the upward-downward direction set as a Y-axis, and the depth direction set as a Z-axis. After the control section 100 derives an amount of movement of a display region on the basis of a display region moving request signal supplied from the input device 20, the control section 100 derives the coordinates of four corners of a frame (frame coordinates) in the virtual space using the amount of movement. The frame coordinates in the virtual space are used to load compressed data into the main memory 60 and generate a display image.

For example, for changes in the resolution of the display image, change boundaries are set between the layers on the Z-axis. When the Z-coordinate of a frame crosses such a change boundary according to a display region moving request signal, a layer used for rendering the display image is changed. Then, loading and decoding are performed as required, and enlargement/reduction is performed according to a requested resolution, whereby the display image is generated. Incidentally, in place of the frame coordinates in the virtual space, the image processing device 10 may derive information identifying a layer and texture coordinates (UV coordinates) in the layer. Hereinafter, a combination of the layer identifying information and the texture coordinates will also be referred to as frame coordinates.

Figure 3:
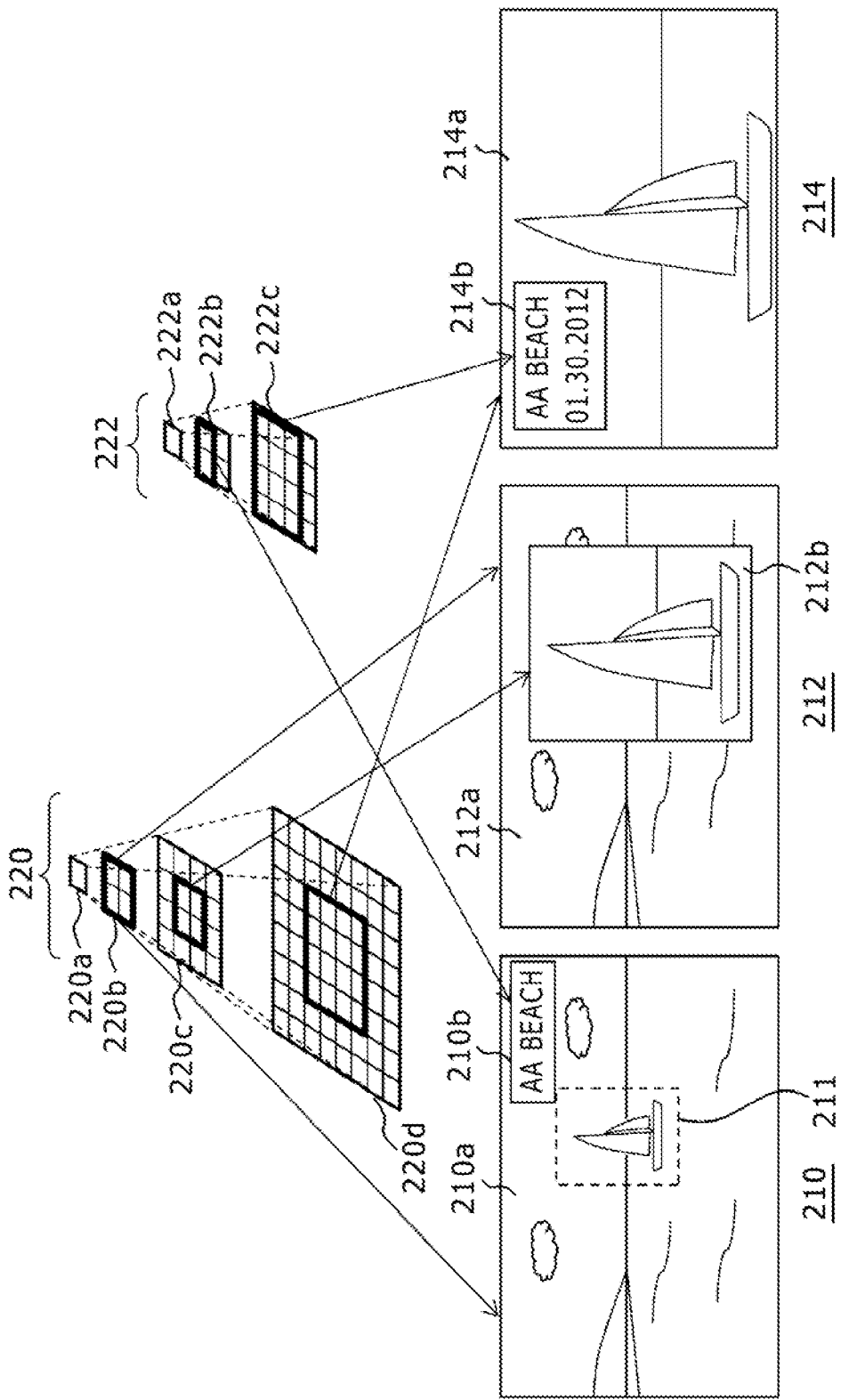
FIG. 3 is a diagram schematically showing relations between the data of tile images used for rendering and a display screen in the present embodiment.

The present embodiment realizes not only a mode in which one image is displayed on the entire screen but also a mode in which a plurality of images operable independently are displayed simultaneously. A section for displaying an image within the screen will hereinafter be referred to as a "viewport," irrespective of whether there is one image or a plurality of images. FIG. 3 schematically shows relations between the display screen and the data of tile images used for rendering when hierarchical data is used as image data.

In the present example, landscape image data 220 and superimposing image data 222 are prepared, the landscape image data 220 being obtained by layering an image of a landscape photograph into a zeroth layer 220a, a first layer 220b, a second layer 220c, and a third layer 220d, and the superimposing image data 222 being obtained by layering an image including character information desired to be displayed in a state of being superimposed on the landscape photograph into a zeroth layer 222a, a first layer 222b, and a second layer 222c. Examples of the screen formed by two viewports using these pieces of hierarchical data are screens 210, 212, and 214.

First, the screen 210 includes a first viewport 210a in which the whole of the landscape photograph is displayed on the entire screen and a second viewport 210b in which a part of the character information is displayed in a state of being superimposed at an upper right of the screen. The image of the first viewport 210a is rendered using the data of tile images in the first layer 220b of the landscape image data 220. The image of the second viewport 210b is rendered using the data of a part of tile images in the first layer 222b of the superimposing image data 222. The layers used in this case are determined by optimum resolution values set according to the sizes of the respective viewports and the sizes of the display regions on the images.

The screen 212 includes a first viewport 212a in which the whole of the landscape photograph is displayed on the entire screen and a second viewport 212b in which a part of the landscape photograph is displayed in an enlarged and superimposed state. As in the case of the screen 210, the image of the first viewport 212a is rendered using the data of the tile images in the first layer 220b of the landscape image data 220. The image of the second viewport 212b is rendered using the data of a part of tile images in the second layer 220c of a higher resolution in the same landscape image data 220.

The screen 214 includes a first viewport 214a in which a part of the landscape photograph is further enlarged than on the screen 212 and displayed on the entire screen and a second viewport 214b in which character information in a wider range than on the screen 210 is enlarged and displayed in a state of being superimposed at an upper left of the screen. The image of the first viewport 214a is rendered using the data of a part of tile images in the third layer 220d of the highest resolution in the landscape image data 220. The image of the second viewport 214b is rendered using the data of a part of tile images in the second layer 222c of a high resolution in the superimposing image data 222.

Thus, in the present embodiment, one or a plurality of viewports can be displayed, and images are rendered independently of each other in viewport units. A display region moving request for enlargement, reduction, or scrolling is received for each viewport. A request to generate or erase a viewport or change the disposition or size of a viewport is also received. For example, when the user performs an instruction input for specifying a partial region 211 within the first viewport 210a on the screen 210 and enlarging the partial region 211, the second viewport 212b displaying the region is generated. Then, the screen 212 can be displayed by increasing the size of the second viewport 212b according to an amount of enlargement.

Thus providing a plurality of viewports can realize flexible and free image expression. When the image data is hierarchical data, in particular, even in the case of same images, a plurality of images that are greatly differ from each other in resolution can be displayed simultaneously as in the case of the screen 212. In addition, even in the case of different kinds of images assumed to be synthesized with each other such as a landscape image and a superimposing image or the like, when these images are separate pieces of hierarchical data, display mode variations can be increased greatly as compared with preparing originally synthesized image data. Even when there are a plurality of pieces of hierarchical data and a plurality of viewports, a basic processing procedure is not changed in terms of processing in tile image units, so that data control is facilitated.

Figure 4:
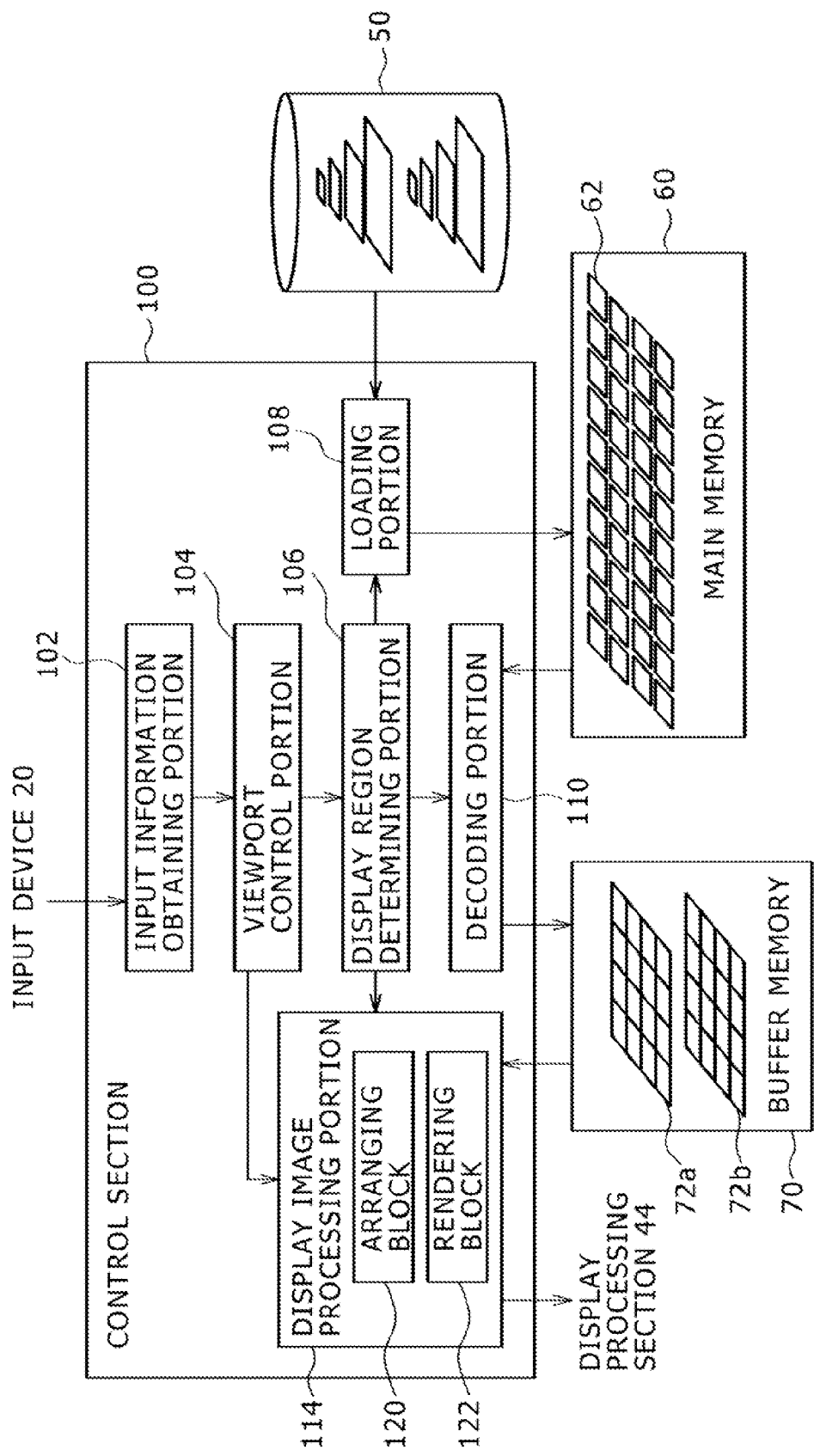
FIG. 4 is a diagram mainly showing, in more detail, a configuration of a control section of the image processing device in the present embodiment.

FIG. 4 mainly shows, in more detail, the configuration of the control section 100 of the image processing device 10 in the present embodiment. The control section 100 includes: an input information obtaining portion 102 for obtaining information input by the user from the input device 20; a viewport control portion 104 for controlling viewports according to the input by the user; a display region determining portion 106 for determining the region of an image to be displayed next in each viewport; and a loading portion 108 for determining tile images to be newly loaded and loading compressed data from the hard disk drive 50. The control section 100 further includes: a decoding portion 110 for decoding the compressed data; and a display image processing portion 114 for rendering a display image.

The elements described as functional blocks performing various processing in FIG. 4 can be formed by a CPU (Central Processing Unit), a memory, and another LSI in terms of hardware, and are realized by a program loaded in a memory or the like in terms of software. As already described, the control section 100 has one PPU and a plurality of SPUs. The PPU and SPUs can form respective functional blocks singly or in cooperation with each other. Hence, it is to be understood by those skilled in the art that these functional blocks can be implemented in various forms by only hardware, only software, or combinations of hardware and software, and are not to be limited to any one of the forms.

The input information obtaining portion 102 obtains details of an instruction to start/end image display, select an image file, move a display region, or operate a viewport, for example, the instruction being input to the input device 20 by the user. The viewport control portion 104 successively determines the number, disposition, and size of viewports forming the screen according to user input information notified from the input information obtaining portion 102. For example, when an instruction input for specifying and enlarging the partial region 211 on the screen 210 in FIG. 3 is performed, a new viewport showing an enlarged image of the region is generated and disposed so as to be superimposed on a corresponding region in the original image, and the size of the viewport at each time is determined according to enlargement speed. In addition to thus changing a viewport according to an instruction input from the user, the viewport control portion 104 may determine the disposition and size of a viewport according to settings prepared together with image data.

Further, the viewport control portion 104 identifies a viewport as an object of a display region moving request notified from the input information obtaining portion 102 on the basis of the disposition of the viewport so that processing in subsequent stages which processing is involved in a display image update can be performed independently for each viewport. Specifically, details of an operation such as enlargement, reduction, scrolling, or the like and the identifying information of a viewport as an object of the operation are associated with each other, and notified to the display region determining portion 106. The display region determining portion 106, the loading portion 108, the decoding portion 110, and the display image processing portion 114 perform their respective processing in association with the identifying information of the viewport, and thereby display image control for each viewport can be realized.

The display region determining portion 106 determines frame coordinates at each time determined by a frame rate, according to information on the frame coordinates of a present display region in each viewport and the display region moving request input by the user. In addition, when frame coordinates change as the size of a viewport is changed, information on the frame coordinates at each time is obtained from the viewport control portion 104. The information on the frame coordinates is notified to each of the loading portion 108, the decoding portion 110, and the display image processing portion 114.

The loading portion 108 determines tile images to be loaded into the main memory 60 in advance on the basis of the information from the display region determining portion 106. In addition, when there are tile images yet to be loaded, the loading portion 108 loads the data of the tile images from the hard disk drive 50 into the main memory 60. The tile images to be loaded into the main memory 60 in advance are not only tile images included in the display region notified from the display region determining portion 106 but also tile images within a predetermined range around the periphery of the tile images included in the display region, tile images in a region predicted to be necessary hereafter from changes in frame coordinates in the past, and the like. The data of tile images other than those necessary in rendering an immediately subsequent display image may be loaded periodically at predetermined time intervals, for example.

The same figure schematically shows a state in which the data of a plurality of tile image groups 62 is loaded in the main memory 60. However, loading processing may be performed in tile image units or in image block units each formed by collecting together a plurality of tile images. When index data (not shown) associating the identifying information of the data of each tile image with the original hierarchical data stored on the hard disk drive 50, a layer in the hierarchical data, and a position on the image is prepared separately, the data of tile images necessary for rendering can be identified on the basis of frame coordinates. Hence, order of storage in the main memory 60 is not particularly limited. In addition, all of image data can be handled uniformly in tile image units irrespective of the number of pieces of hierarchical data and viewports.

The decoding portion 110 reads the data of necessary tile images from the main memory 60 on the basis of the information on the frame coordinates of each viewport which information is obtained from the display region determining portion 106, decodes the data, and stores the data in the buffer memory 70. The same figure schematically shows the data 72*a* and 72*b* of two display images corresponding to two viewports as the data stored in the buffer memory. In practice, however, as in the main memory 60, the order of storage of the data is not particularly limited as long as the data is associated with the viewports to be displayed.

In addition, the number of pieces of corresponding display image data differs according to the number of viewports. The display image data 72*a* and 72*b* is formed at least by the data of one or a plurality of tile images including images of display regions in the respective viewports. Preferably, more tile images around the periphery of the display region in each viewport are decoded, whereby the display image can be updated smoothly in response to a scrolling request by the user. In addition, when tile images in other layers representing the same region are decoded, the display image can be updated smoothly also in response to an enlarging or reducing request.

The display image processing portion 114 includes an arranging block 120 and a rendering block 122. The arranging block 120 associates an update region on the screen with the data of tile images necessary for updating the update region on the basis of the disposition and size of each viewport on the screen which disposition and size are notified from the viewport control portion 104 and the frame coordinates notified from the display region determining portion 106. According to the association, the rendering block 122 reads the data of the tile images from the buffer memory 70, and renders a display image in the frame memory of the display processing section 44 so as to update the display image within the viewport as the updating object on the basis of the notified frame coordinates.

Figure 5:
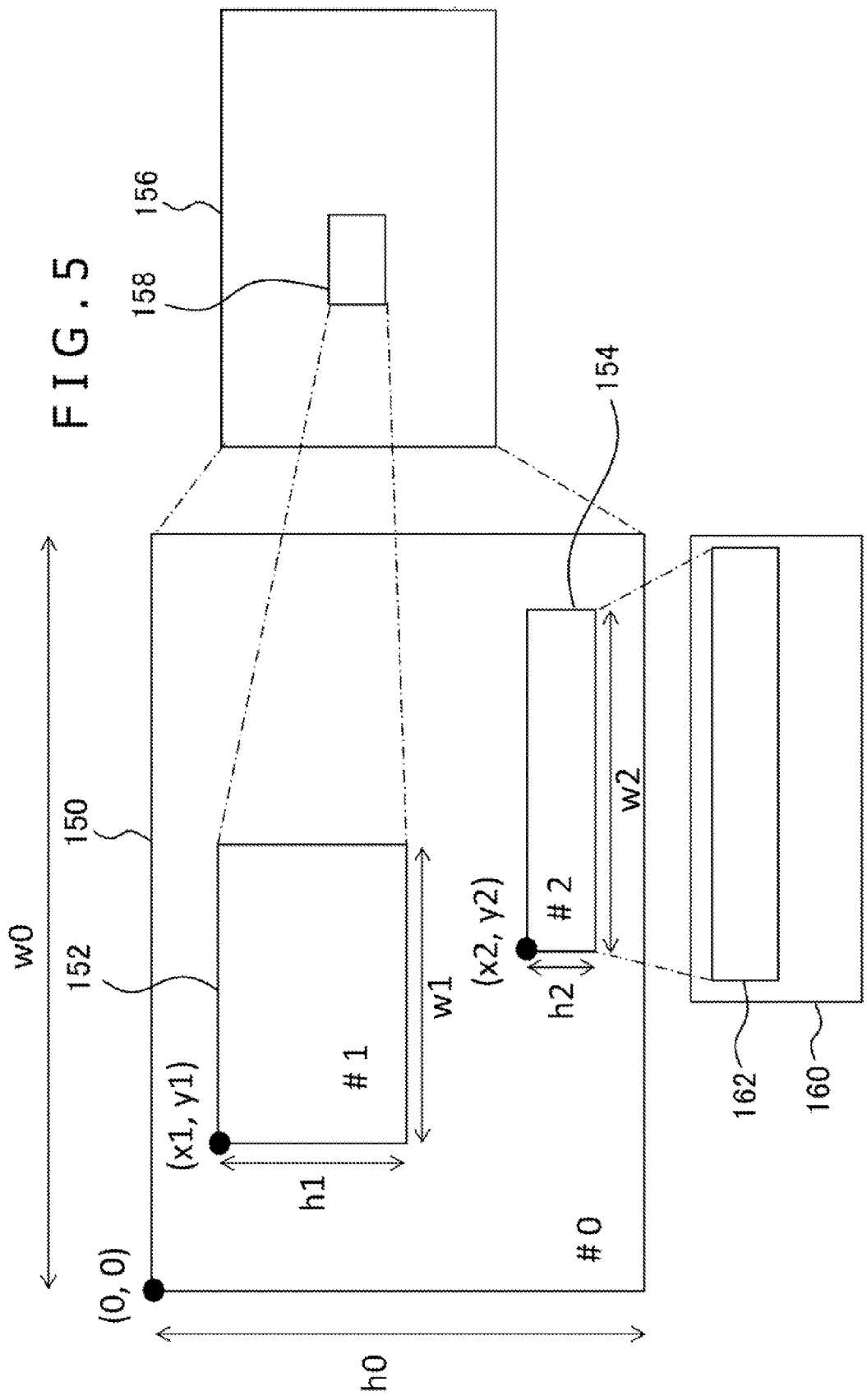
FIG. 5 is a diagram schematically showing parameters generated for a viewport control portion to control viewports in the present embodiment.

FIG. 5 schematically shows parameters generated for the viewport control portion 104 to control viewports. A rectangle 150 in FIG. 5 represents the display screen of the display device 12. Suppose that the identification number of a viewport corresponding to the screen is "0," and that the identification numbers of two viewports 152 and 154 displayed so as to be superimposed on the viewport corresponding to the screen are "1" and "2," respectively. The viewport control portion 104 manages the viewports by the identification number of each viewport and the disposition and size, for example the upper left coordinates and vertical/horizontal length of each viewport.

For example, as shown in FIG. 5, supposing that the upper left coordinates of the viewport (rectangle 150) having the identification number "0" are (0, 0) and the horizontal and vertical lengths of the viewport having the identification number "0" are w0 and h0, the viewport is generated by creating a data set (0, (0, 0), (w0, h0)). Similarly, parameters (1, (x1, y1), (w1, h1)) are generated for the viewport 152, and parameters (2, (x2, y2), (w2, h2)) are generated for the viewport 154. When a need to change the disposition and size of a viewport arises according to an operation by the user or the like, the corresponding parameters other than the identifying information are updated.

The viewport control portion 104 further associates the identification number of each viewport with the frame coordinates of an image to be displayed first in the viewport. The example of FIG. 5 shows a state in which an image 156 and an image 160 are prepared as display objects, and in which the frame coordinates of the entire region of the image 156, the frame coordinates of a partial region 158 of the image 156, and the frame coordinates of a partial region 162 of the image 160 are associated with the viewports having the identification numbers "0," "1," and "2," respectively. While the size of a viewport is changing according to a viewport operation by the user or the like, the viewport control portion 104 increases or decreases the range of the display region according to the size change, and determines the frame coordinates at each time.

Figure 6:
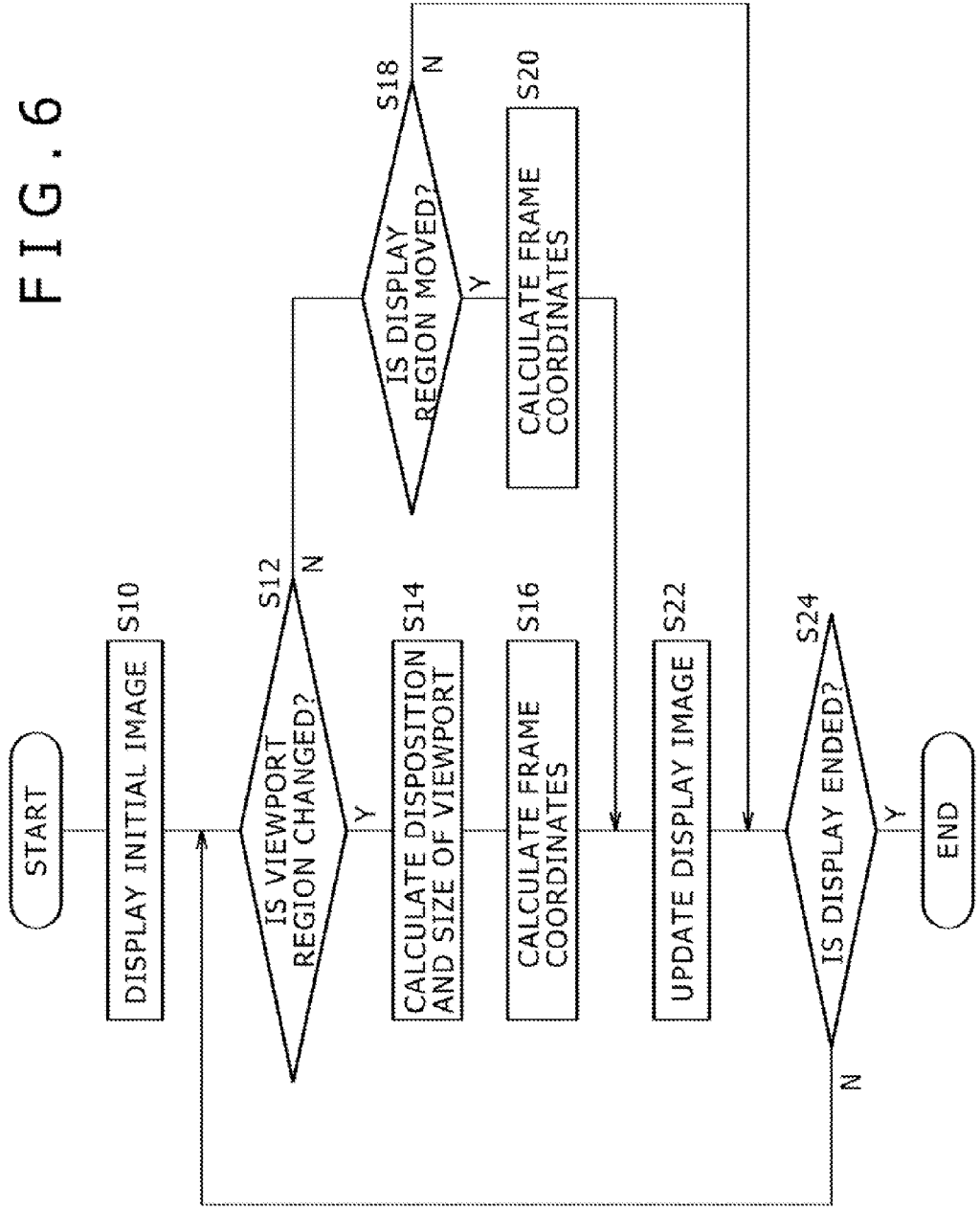
FIG. 6 is a flowchart of a processing procedure in which the image processing device displays an image in the present embodiment.

Description will next be made of basic operation of the image processing device 10. FIG. 6 is a flowchart of a processing procedure in which the image processing device 10 displays an image. First, an initial image is displayed according to an instruction input for selecting image data, starting display, or the like by the user (S10). This processing is performed by loading, decoding, and rendering the data of an image set as the initial image. When the user performs an operation of changing the region of a viewport by for example generating a new viewport or changing the disposition or size of an originally present viewport (Y in S12), the viewport control portion 104 calculates the disposition and size of the viewport according to the operation (S14).

Further, the viewport control portion 104 calculates the frame coordinates of a display region to be displayed in the viewport (S16). When the viewport is changed gradually, the processing of S14 and S16 is performed for each time. Information on the disposition and size of the viewport is notified to the display image processing portion 114 in association with the identification number of the viewport. Information on the frame coordinates is notified to the display region determining portion 106 in association with the identification number of the viewport. Therefore, using the data of tile images loaded and decoded by the loading portion 108 and the decoding portion 110, the display image processing portion 114 disposes the viewport in an appropriate position and updates the display image (S22).

On the other hand, when the operation of changing the region of the viewport is not performed, but an operation of moving the display region within the viewport is performed (N in S12 and Y in S18), the viewport control portion 104 notifies a corresponding display region moving request signal to the display region determining portion 106 as it is in association with the identification number of the viewport of interest. Receiving the display region moving request signal, the display region determining portion 106 calculates new frame coordinates by adding an amount of movement according to the display region moving request signal to the frame coordinates thus far of the viewport of interest (S20).

Then, the display image of the viewport of interest is updated by cooperation of the loading portion 108, the decoding portion 110, and the display image processing portion 114 (S22). While the user does not perform an instruction input for ending the image display (N in S24), the processing of S12 to S22 is repeated. When the instruction input for ending the image display is performed, the processing is ended (Y in S24). Incidentally, the input device 20 is provided with operating means that determines the branch determinations of S12 and S18, that is, whether to change the region of a viewport or whether to move the display region within the viewport. Alternatively, the determinations may be made by providing a rule to procedures of operation on the touch panel and the like, and comparing the rule with an actually performed operating procedure.

Figure 7:
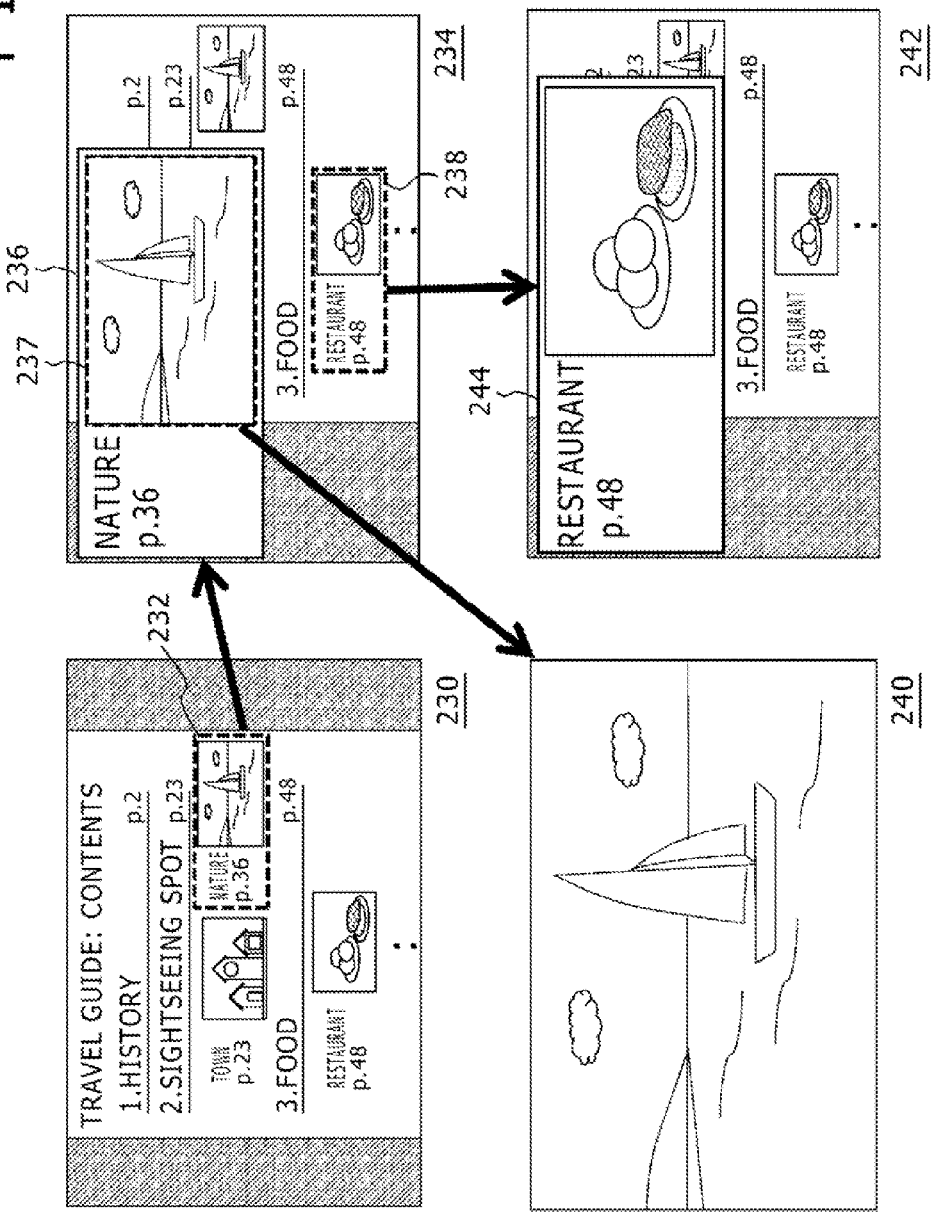
FIG. 7 is a diagram showing an example of a display screen that can be realized by the device configuration of the present embodiment.

FIG. 7 shows an example of a display screen that can be realized by the above-described device configuration. The example of the same figure assumes an electronic book of a travel guide. A screen 230 displays an image looking down at one page of a table of contents of the electronic book. At this time, there is one first viewport formed of the entire screen. When the user specifies a region 232 of an item of interest on the screen 230, and performs an enlarging operation, the viewport control portion 104 generates a new second viewport for displaying an enlarged image of the specified region. Then, the area of the second viewport is increased according to the enlarging operation, and the frame coordinates are changed in an enlarging direction. The disposition of the second viewport may be determined by the user by moving the second viewport, or may be determined according to a rule set in advance.

Accordingly, the loading portion 108 loads the data of tile images in a layer changed as required, and the decoding portion 110 decodes the data. The display image processing portion 114 uses the data to render an image of a display region within the second viewport. A screen 234 showing the second viewport 236 in a state of being superimposed on the first viewport is thereby displayed. When the image displayed in the second viewport 236 is rendered using data in a layer of a higher resolution than the image of the first viewport, a clearer enlarged image can be displayed.

As for the specification of the region 232 on the screen 230, one of regions set for each item in the original image in advance may be selected by using the input device 20, or the user may be allowed to specify a region freely using the pointing device, the touch panel, or the like forming the input device 20. The present embodiment can enlarge and reduce an arbitrary region in the display image by changing a layer used for rendering, and can therefore deal with free region specifications as in the latter case.

On the screen 234, the image of the table of contents which image is displayed in the first viewport is displayed in a state of being shifted to the right as compared with the screen 230.

Such scrolling may be performed by the user, or a rule that the image be shifted in a direction of reducing an overlap region when the disposition of the second viewport 236 is determined, for example, may be set in advance. In this case, the viewport control portion 104 determines new frame coordinates of the display image in the first viewport, and notifies the new frame coordinates to the display region determining portion 106.

When a region 237 displaying a photograph in the second viewport 236 on the screen 234 is specified, and further an enlarging operation is performed, the viewport control portion 104 for example returns the viewports to one viewport, and makes a screen 240 displayed which screen 240 is formed by only an enlarged image of the specified region. For example, the size of the viewport itself is increased according to the enlarging request, and when the size of the viewport becomes identical with the size of the screen, the originally present first viewport is erased. Alternatively, a threshold value may be provided for an enlargement ratio, and when the enlargement ratio exceeds the predetermined threshold value according to the enlarging request, the enlarged image may be displayed on the entire screen.

At this time, the enlarged image of the specified region may be rendered using the data of a layer of an even higher resolution in the hierarchical data of the original image of the table of contents, or display may be changed to an image of a page corresponding to the specified item among text pages of the electronic book. In the latter case, the viewport control portion 104 notifies the identifying information of the hierarchical data of the image after the change to the display region determining portion 106 together with frame coordinates. When the loading portion 108 accordingly loads the tile images of the hierarchical data from the hard disk drive 50, subsequent processing is performed similarly irrespective of the hierarchical data.

On the other hand, when another region 238 in the first viewport on the screen 234 is specified and an enlarging operation is performed, the viewport control portion 104 erases the second viewport 236 displayed on the screen 234, and generates a third viewport 244 displaying an enlarged image of the specified region. As a result, a screen 242 showing the third viewport 244 displaying the new enlarged image in a state of being superimposed on the first viewport is displayed. Alternatively, without the second viewport 236 on the screen 234 being erased, the display image of the second viewport 236 may be updated to the image of the newly specified region 238.

The example of FIG. 7 is an example of screen changes realized for operations of enlarging a specified region. However, the present embodiment can perform enlargement, reduction, and scrolling in each viewport independently, as described above. Thus, screens that can be displayed are not limited to these screens. For example, the image in the second viewport 236 can also be scrolled to display an adjacent item.

In addition, assignment is performed to the input means of the input device 20 as appropriate so that the second and third viewports displayed on the screen 234 and the screen 242 can be erased, and so that a new viewport displaying the original image of the table of contents can be displayed on the screen 240. These configurations enable free image expressions such as changing the enlargement ratio of a same image in different regions or displaying different images in a state of being superimposed on each other, and can realize contents that allow desired information to be reached easily.

In the example shown in FIG. 7, various image expressions are performed by superimposing a plurality of viewports on each other on the screen. In this case, the larger the number and area of viewports, the larger the number of tile images necessary for rendering. When the number of tile images as processing objects is increased, the load of data loading processing and decoding processing is increased, and necessary resources such as a bandwidth required for data transfer, data storage regions in the main memory 60 and the buffer memory 70, and the like are increased.

On the other hand, when a display object image is prepared as hierarchical data, there is an advantage in that even when display is made on any device, by appropriately selecting a layer as a processing object according to the area of the display, the image can be displayed in a similar manner by only the processing of a number of tile images which number is steady and suitable for the resources of each device. When the number and area of viewports are made variable as described above, an amount of necessary resources is not stable, so that the above advantage of hierarchical data may be impaired in some cases. Accordingly, description will next be made of a method for realizing a free image expression using a plurality of viewports while maintaining the advantage of hierarchical data. Incidentally, the method to be described in the following can be combined with the modes described thus far as appropriate.

Figure 8:
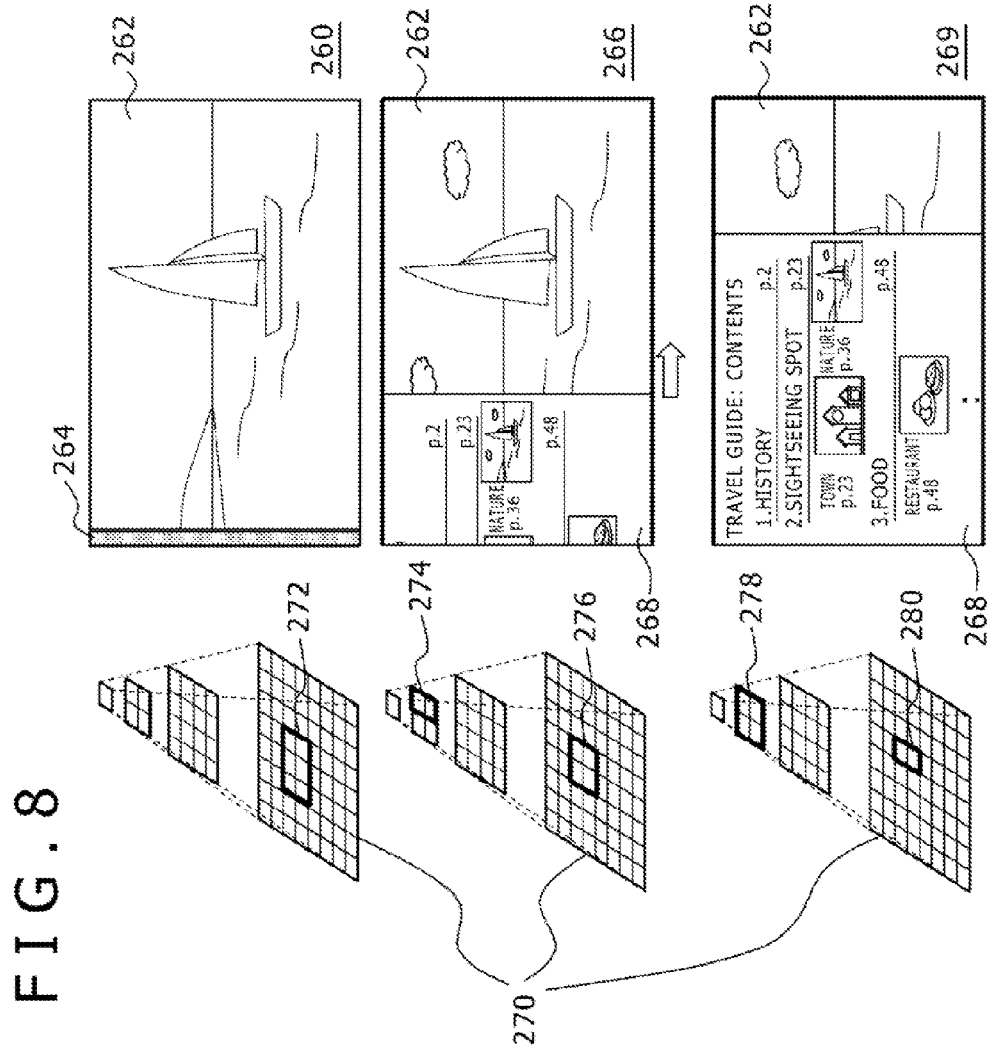
FIG. 8 is a diagram of assistance in explaining a method for making a total area of viewports invariable in the present embodiment.

FIG. 8 is a diagram of assistance in explaining a method for making a total area of viewports invariable so that an amount of resource consumption is constant irrespective of the number of viewports. In the same figure, as with the screen 240 in FIG. 7, for example, a screen 260 is formed by only a first viewport 262 displaying an image obtained by enlarging the photograph included in the image of the table of contents. Specifically, the hierarchical data 270 of the image of the table of contents is set as a processing object, and the display image is rendered using the data of tile images of a partial region 272 in a third layer of the hierarchical data 270.

The screen 260 displays not only a first viewport 262 but also a tag 264 shown in the shape of a band at a left edge of the screen. The tag 264 is a GUI (Graphical User Interface) for generating a second viewport for displaying the whole of an image, or the whole of the image of the table of contents in the example of FIG. 8. However, the shape and position of the tag 264 are not limited to this. When the user indicates the tag 264 on the screen 260 via the input device 20, the tag 264 changes to a second viewport 268, and the second viewport 268 is made to appear gradually according to an operation of scrolling in a right direction (screens 266 and 269). Preferably, when the input device 20 is the touch panel on the screen, and the second viewport 268 is drawn out by a finger, an intuitive operation is realized.

The area of the second viewport 268 is increased by this display change. At this time, a total area of the first and second viewports is held constant by excluding a region in the display image of the first viewport 262 which region is concealed by the overlapping of the second viewport 268 from rendering objects. When the display image of the second viewport 268 is rendered in a first layer of the hierarchical data 270 as shown in FIG. 8, the second viewport 268 is rendered on the screen 266 using the data of tile images in a right half region 274 of the image of the first layer which right half region 274 is shown on the screen.

The second viewport 268 is rendered using the data of tile images in a region 278 of the entire image of the first layer on the screen 269 displaying the whole of the image of the table of contents. Meanwhile, as the first viewport 262 changes from the screen 260 to the screen 266 to the screen 269, the concealed part of the first viewport 262 is excluded from rendering objects, thereby decreasing the number of tile images necessary for rendering the first viewport 262, as in the regions 272, 276, and 280 in the third layer. As a result, a total number of tile images necessary for rendering the images of all of the viewports is six in the state of any screen in the example of FIG. 8.

In actuality, the number of tile images as processing objects is slightly increased or decreased depending on positional relations between the boundary lines of the display regions and divisions between tile images as well as the number of tile images on the periphery of the display regions which tile images should be decoded speculatively. However, even when such an increase or decrease is taken into consideration, an amount of necessary resources can be made substantially steady by thus excluding the concealed region from rendering objects. For example, when the data of tile images rendered unnecessary is invalidated in the main memory 60 and the buffer memory 70, the data of tile images rendered unnecessary can be overwritten with the data of tile images for a new viewport. Thus, a necessary memory capacity is not increased.

Incidentally, the two viewports are represented by using one piece of hierarchical data in the example of FIG. 8. However, the display images of the respective viewports may be rendered using different pieces of hierarchical data. In addition, display object image data may include not only hierarchical data but also image data of one resolution.

In addition, as described above, each viewport is configured to allow the display image therein to be controlled independently. Thus, for example, on the screen 266, the display image in the first viewport 262 can be enlarged, reduced, or scrolled, and the second viewport 268 can be scrolled in an opposite direction to be retracted. In addition, when the region of one of items or photographs in the image of the table of contents is specified in the second viewport 268 on the screen 269, an image of the specified region may be displayed in an enlarged state in the first viewport 262, or an image of a corresponding text page may be displayed in the first viewport 262.

Figure 9:
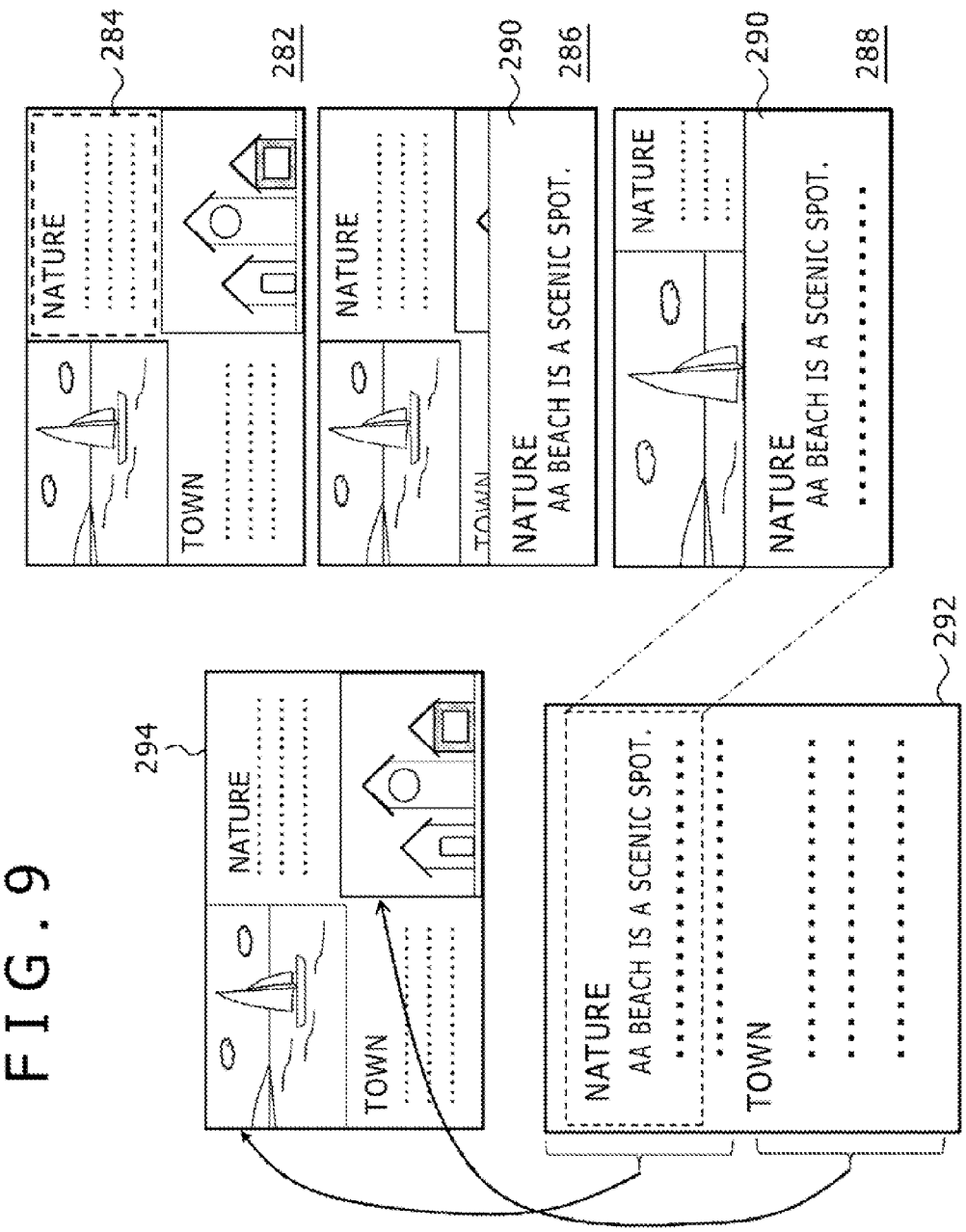
FIG. 9 is a diagram showing another screen example when a total area of viewports is made invariable in the present embodiment.

FIG. 9 shows another screen example when a total area of viewports is made invariable. An image of a page where text and photographs are mixed with each other is assumed as a display object in the present example. First, a screen 282 is formed by one viewport displaying the whole of the page. When the user performs an input for specifying a text region 284 on the screen 282, a second viewport 290 in which the text is enlarged so as to be viewed more easily is made to appear from the bottom of the screen, as shown on a screen 286. For example, when the input device 20 is the touch panel on the screen, and the text region 284 is touched for a predetermined time or more on the screen 282, an upper edge of the second viewport 290 appears at a lower edge of the screen.

Then, the user can proceed with reading the text by scrolling the second viewport 290 to an upper side (screen 288). An upper limit may be set to the area of the second viewport 290, and after the upper limit is reached, only the text within the viewport may be scrolled by scrolling operation without the area of the viewport being changed.

As shown on the left side of FIG. 9, as the image to be displayed in the second viewport 290, the data of an image 292 in which only the text is extracted may be prepared separately from an original page image 294. In this case, as indicated by arrows in the same figure, information associating regions of the image 292 of only the text with photograph regions in the original page image 294 may be prepared on the basis of correspondence relation between the text and the photographs in the original page image 294, and as the text is scrolled in the second viewport 290, a corresponding photograph may be displayed in the first viewport. Incidentally, in the case of the page image in which the text regions and the photograph regions are originally separated from each other in the form of columns, a similar mode can be realized by the identical image data.

Figure 10:
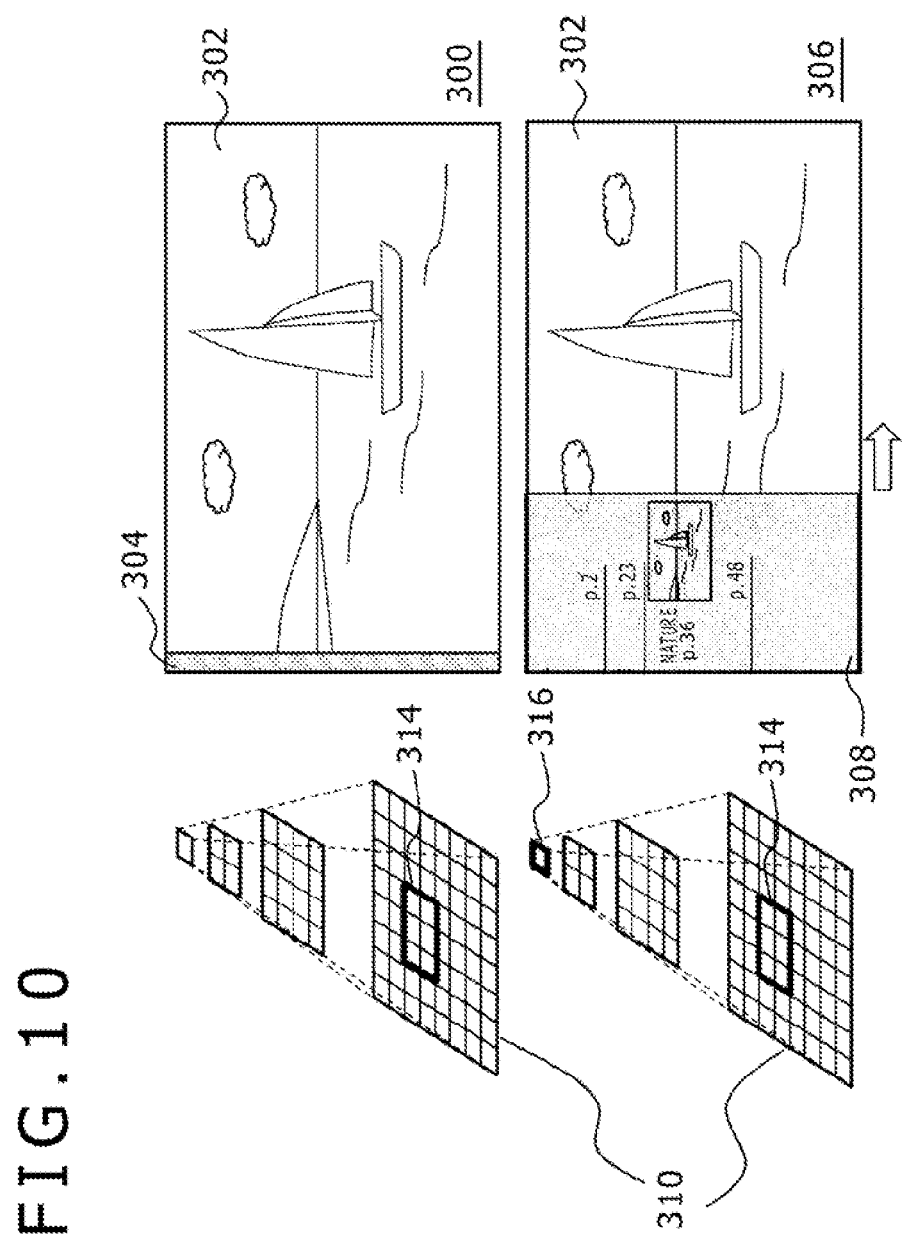
FIG. 10 is a diagram of assistance in explaining a method for adjusting a layer used for rendering in the present embodiment.
Figure 11:
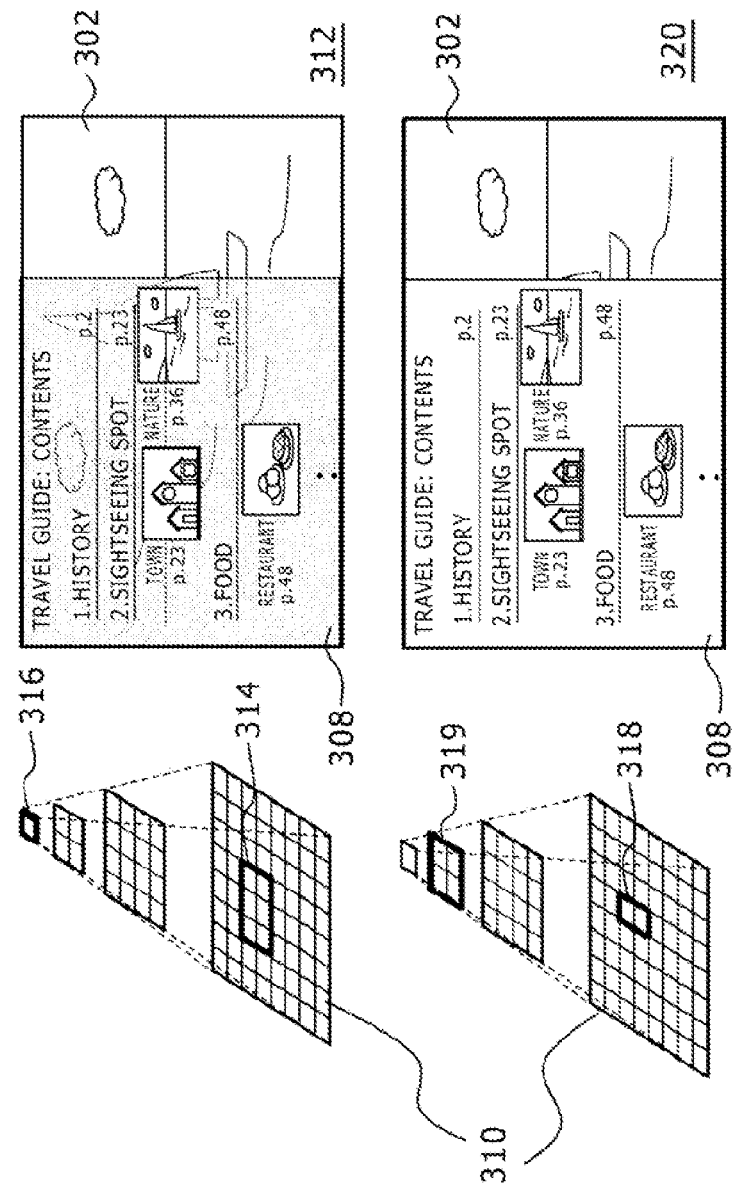
FIG. 11 is a diagram of assistance in explaining the method for adjusting the layer used for rendering in the present embodiment.

FIGS. 10 and 11 are diagrams of assistance in explaining a method for adjusting a layer used for rendering in order to make an amount of resource consumption constant irrespective of the number of viewports. As with the screen 260 in FIG. 8, a screen 300 in FIG. 10 displays an image of an enlarged photograph in a first viewport 302 using the data of tile images in a partial region 314 in a third layer of hierarchical data 310 of the image of the table of contents. A tag 304 is displayed at a left edge of the screen.

When the user indicates the tag 304 on the screen 300, and performs a scrolling operation of moving the tag 304 in a right direction, a second viewport 308 displaying the whole of the image of the table of contents appears in such a manner as to be drawn out from the position of the tag 304, as shown on a screen 306. This is the same as in FIG. 8. However, in FIGS. 10 and 11, the display image of the first viewport 302 is left as it is, and instead the layer used for rendering the second viewport 308 is a layer of a lower resolution than a layer that should be originally used.

Supposing that an appropriate layer for displaying the whole of the image in the size of the second viewport 308 is the first layer as shown in FIG. 8, the method of FIGS. 10 and 11 renders the second viewport 308 using the data of a zeroth layer of a lower resolution than the first layer. The zeroth layer in the present example is formed by one tile image 316. Thus, the number of tile images is not changed by changes in the display region. The display image processing portion 114 enlarges the tile image 316 to the size of the second viewport 308.

The first viewport 302 is rendered using the data of tile images in the region 314 in the third layer, which is the same as used for rendering the screen 300 in the hierarchical data 310. As shown in FIG. 10, a region of the first viewport 302 which region coincides with the second viewport 308 may be made visible by making translucent the whole of the image of the second viewport 308 or only the background of the second viewport 308 on the screen 306.

After the second viewport 308 continues being scrolled, the whole of the image of the table of contents appears in the second viewport 308, as shown on a screen 312 in FIG. 11. Also at this time, the second viewport 308 is rendered using the data of the tile image 316 in the zeroth layer of the hierarchical data 310, and the first viewport 302 is rendered using the data of tile images in the region 314 in the third layer of the hierarchical data 310.

Then, at a point in time that the user stops the scrolling operation, the layer used for rendering the second viewport 308 is changed to the appropriate layer, and a region in the display image of the first viewport 302 which region is concealed by the overlapping of the second viewport 308 is excluded from rendering objects. A screen 320 displayed as a result is similar to the screen 269 in FIG. 8. That is, the first viewport 302 is rendered using the data of tile images in a small region 318 in the third layer, and the second viewport 308 is rendered using the data of tile images in a region 319 in the first layer. Incidentally, the change from the screen 312 to the screen 320 is not only made when the whole of the image of the table of contents is displayed in the second viewport 308, but also it suffices for the change to be made at a point in time that the user stops the scrolling operation.

In general, attention is rarely paid to even details of an image being scrolled, and attention is often paid to the image for the first time at a point in time that the scrolling is stopped.

This tendency becomes strong especially when scrolling operation is performed using the touch panel on the screen in a state of the screen being hidden by a finger. That is, an image of a somewhat coarse image quality is considered to cause a little stress to the user in the middle of scrolling.

Utilizing this characteristic, for a viewport in the middle of scrolling, a display image is generated by enlarging a tile image in a layer of a low resolution, and image data in an appropriate layer is used at a point in time that the scrolling is stopped. By thus estimating a degree of attention of the user and accordingly adjusting the number of tile images by changing a layer used for rendering, variations in the number of tile images to be processed can be suppressed in any states of viewports, and an amount of necessary resources can be made substantially steady.

In the example of FIGS. 10 and 11, the data in the layer of a low resolution is used until the scrolling of the new second viewport 308 made to appear is stopped. Also in a case where a display image within an originally displayed viewport is scrolled, variations in the number of tile images to be processed can be suppressed by performing similar processing. When the user performs scrolling at a high speed, for example, it is necessary to predict a destination to which the display region moves hereafter and speculatively load and decode the data of tile images in a wider range, as described above, for a smooth image transition.

As a result, the number of tile images to be processed varies according to the scrolling speed. Accordingly, during a period during which the scrolling speed exceeds a predetermined threshold value, a layer used for rendering is changed to a layer of a low resolution, and the layer of the low resolution is displayed in an enlarged state. This does not pose a problem in the viewing of the image because there is a small possibility of the user closely checking the image being scrolled during the period of fast scrolling. As a result, it suffices to process about a same number of tile images at all times, and variations in the amount of resource consumption can be suppressed.

FIG. 12 shows another screen example when a layer used for rendering is adjusted. This example shows various screens that can be displayed when using hierarchical data 350 of the image of the landscape photograph and hierarchical data 352 of the superimposing image including the character information desired to be displayed in a state of being superimposed on the landscape photograph. First, a screen 330 is formed by only a first viewport 331 in which the whole of the landscape image is rendered using tile images in a second layer 353 of a resolution suitable for the size of the display. When the user specifies a region 332 and inputs an enlarging instruction, a second viewport 336 displaying an enlarged image of the region is generated, as shown on a screen 334.

The image of the second viewport 336 is rendered using the data of tile images in a region 354 in a third layer having a resolution appropriate for displaying the region in the size of the second viewport 336. At this time, the attention of the user is assumed to be focused on the second viewport 336. Thus, the layer used for rendering the first viewport 331 is changed from the second layer 353 to a first layer 356 to thereby decrease the number of tile images as a processing object.

Incidentally, the layer used for displaying the second viewport 336 may be a layer of a lower resolution during a period during which the second viewport 336 is enlarged in the process of a transition from the screen 330 to the screen 334. This is because a degree of attention to the image being enlarged is considered to be low especially when enlarging operation is performed by a finger using the touch panel as in the case of the above-described scrolling operation.

When an operation of enlarging the size of the second viewport 336 is performed on the screen 334, and the range of the second viewport 336 reaches the entire surface of the display, the original first viewport 331 is erased, as shown on a screen 338. When a function of receiving the operation of thus enlarging the size of a viewport is assigned to a touch panel provided separately on the back surface of the image processing device 10, for example, the operation of thus enlarging the size of a viewport can be separated from display image enlarging operation on the touch panel on the front surface, that is, on the screen. In this case, the display image is not hidden by a finger, and thus the second viewport 336 is rendered using the data in the third layer of the same high resolution also in the process of the transition.

Incidentally, for a similar reason, the touch panel provided on the back surface may be used for low-speed enlarging operation during which high image quality is maintained, and the touch panel provided on the front surface may be used for high-speed enlarging operation with coarse image quality. A third viewport 340 displaying a part of the superimposing image is further made to appear on a screen 338 from a right edge of the screen. This third viewport 340 may be displayed by scrolling operation by operating a tag as shown in FIG. 8 or the like, or such a function may be assigned to one of the input means of the input device 20.

The image of the second viewport 336 on the screen 338 is rendered using the data of tile images in a region 358 obtained by further expanding the region 354 in the third layer used to display the screen 334 in the hierarchical data 350 of the landscape image. Meanwhile, the image of the third viewport 340 is rendered using the data of tile images in a region 360 in a first layer, which has a lower resolution than a second layer having an appropriate resolution in the hierarchical data 352 of the superimposing image. This is because a degree of attention to the image in the middle of scrolling is assumed to be low, as described above. The background of the image of the third viewport 340 at this time is made transparent or translucent.

Then, when the operation of scrolling the third viewport 340 is stopped (screen 342), the data used for rendering the third viewport 340 is changed to a region 364 in the second layer having the appropriate resolution, and a region of the second viewport 336 which region is concealed by the third viewport 340 is excluded from rendering objects. As a result, tile images used for rendering in the hierarchical data 350 of the landscape image are in a region 362 smaller than the region used for the screen 338. The screen 342 is in a similar state to the mode shown in FIG. 9. Thus, similar processing can be performed, such as changing the image of the second viewport 336 to the image associated with the character information being displayed according to the scrolling of the character information within the third viewport 340, for example.

In addition to thus scrolling a viewport, also in cases where a viewport in which a specified region is enlarged is generated and where viewports are generated by a plurality of pieces of hierarchical data, respectively, changing a layer being used as appropriate according to an estimated degree of attention or the like can suppress variations in the number of tile images as processing objects, and thus make an amount of resource consumption steady.

According to the present embodiment described above, the number and arrangement of viewports forming a display screen are made variable according to operations by the user and rules set in advance, and frame coordinates are determined in association with the viewports, whereby a display region can be moved independently for each viewport. Therefore, in a case where a plurality of images such as a photograph and text or the like are synthesized with each other and displayed, only one of the plurality of images can be scrolled, enlarged, or reduced, and thus free image expressions can be realized.

Here, when image data has a hierarchical structure formed by layering data of different resolutions, the enlargement and the reduction can be expressed more dynamically, and also images that are generated from one image but greatly differ from each other in resolution can be displayed simultaneously in different viewports. Further, by handling all of image data in tile image units divided in a predetermined size, loading processing and decoding processing can be performed similarly even when a plurality of images are set as display objects, and complex image expressions can be realized even with a simple device configuration.

Further, in a situation in which a plurality of viewports are displayed in a state of being superimposed on each other, a part concealed by an overlap is exclude from rendering objects. Alternatively, the image of a viewport to which a low degree of attention is predicted to be paid by the user, such as a viewport in the middle of scrolling or the like, is rendered using image data of a low resolution. These measures enable an amount of data used for rendering to be held constant, and thus enable variations in an amount of resource consumption to be suppressed, even when the number and area of viewports are made variable. This is effective particularly in a technology for realizing similar image display on various devices using versatile hierarchical data.

The present invention has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present invention.

REFERENCE SIGNS LIST

For example, in the present embodiment, description has been made of a case where mainly hierarchical data is used as a processing object. However, image data of one resolution may also be used. When such image data is divided into tile images and then processed as in the present embodiment, for example, free image expressions can be realized by similar processing in tile image units irrespective of the number of pieces of image data and the number of viewports. In addition, a similar effect of being able to make the number of tile images as processing objects substantially constant and the like can be obtained by subjecting viewports superimposed on each other to similar adjustments to those of the present embodiment.

An image as a processing object may be a still image or a moving image regardless of whether or not the image is hierarchical data. An image as a processing object may be obtained by imaging a display screen of a web browser, for example. In such a case, an accurate and clear image can be displayed at all times even when free image operations such as enlargement, reduction, and the like are performed, without various languages and font data in many sizes being prepared in a device.

10 Image processing device, 12 Display device, 20 Input device, 30 Zeroth layer, 32 First layer, 34 Second layer, 36 Third layer, 44 Display processing section, 50 Hard disk drive, 60 Main memory, 70 Buffer memory, 100 Control section, 102 Input information obtaining portion, 104 Viewport control portion, 106 Display region determining portion, 108 Loading portion, 110 Decoding portion, 114 Display image processing portion, 120 Arranging block, 122 Rendering block.

INDUSTRIAL APPLICABILITY

As described above, the present invention is applicable to an information processing device such as a computer, an image processing device, an image display device, a portable terminal, a game machine, and the like.

The invention claimed is:

1. An image processing device comprising:
an image data storage portion for storing hierarchical data formed by layering, in order of resolution, a plurality of pieces of image data representing a display object image with different resolutions, each of the different resolutions being defined by a respective number of image tiles;
a viewport control portion for determining a layer and a region used for rendering an image to be displayed in each of a plurality of viewports generated on a screen of a display device, the layer and the region being included in the hierarchical data;
a display region determining portion for independently updating the layer and the region used for rendering the image to be displayed in each of the plurality of viewports according to an input display region moving request signal, such that a substantially constant burden on the image processing device is maintained, irrespective of changes made in accordance with the input display region moving request signal, by maintaining substantially constant a total number of the image tiles being used to render the image; and
a display image processing portion for reading data of the layer and the region determined by the viewport control portion or the display region determining portion from the image data storage portion, rendering the image of each of the plurality of viewports using the data, and making the image of each of the plurality of viewports displayed on the display device.

2. The image processing device according to claim 1, wherein the viewport control portion changes a size of one or more of the plurality of viewports according to an input viewport size changing request signal, and while changing the size of the one or more viewports, makes the layer used for rendering the image displayed in the viewport a layer of a lower resolution than a resolution of an appropriate layer determined from the size of the viewport and size of the displayed image.

3. The image processing device according to claim 2, wherein at a point in time that input of the input viewport size changing request signal for increasing the size of the one or more viewports is stopped, the viewport control portion changes the layer used for rendering the image of the one or more viewports to the appropriate layer, and invalidates data within a memory, the data having been used for rendering a region within another viewport, the region within the other viewport being concealed by overlapping of the viewport with the other viewport.

4. The image processing device according to claim 1, wherein the viewport control portion changes a size of one or more of the plurality of viewports according to an input viewport size changing request signal, and invalidates data within a memory, the data having been used for rendering a region concealed by overlapping of the one or more viewports with another viewport among viewports constituting the screen, as an overlap area is increased.

5. The image processing device according to claim 1, further comprising:
an input section for receiving an operation by a user for drawing out a tag displayed at an edge of the screen toward a center of the screen,
wherein when the drawing-out operation is started, the viewport control portion changes the tag to a new viewport, and increases size of the viewport as the operation proceeds.

6. The image processing device according to claim 2, wherein while making the layer used for rendering the image displayed in the viewport being changed in size the layer of the lower resolution, the viewport control portion makes a background of the image transparent or translucent.

7. The image processing device according to claim 1, wherein according to an enlarging request signal specifying a region within an image of a certain viewport, the viewport control portion generates a new viewport displaying an enlarged image of the region, and the viewport control portion changes a display region of the image of the original viewport so as to decrease an area concealed by the new viewport.

8. The image processing device according to claim 1, wherein according to a request signal to scroll an image of a certain viewport, the display region determining portion updates a region used for rendering the image such that the image is scrolled, and the display region determining portion changes an image of another viewport to an image associated with the display region after the scrolling.

9. An image processing method comprising:
in an image processing device,
storing hierarchical data formed by layering, in order of resolution, a plurality of pieces of image data representing a display object image with different resolutions, each of the different resolutions being defined by a respective number of image tiles;
determining a layer and a region used for rendering an image to be displayed in each of a plurality of viewports generated on a screen of a display device, the layer and the region being included in hierarchical data;
reading data of the determined layer and the determined region from a storage device, rendering the image of each of the plurality of viewports using the data, and making the image of each of the plurality of viewports displayed on the display device;
independently updating the layer and the region used for rendering the image to be displayed in each of the plurality of viewports according to an input display region moving request signal, such that a substantially constant burden on the image processing device is maintained, irrespective of changes made in accordance with the input display region moving request signal, by maintaining substantially constant a total number of the image tiles being used to render the image; and
reading data of the layer and the region after the update from the storage device, and updating the image of each of the plurality of viewports using the data.

10. A non-transitory, computer readable storage medium containing a computer program for making a computer carry out actions, comprising:
storing hierarchical data formed by layering, in order of resolution, a plurality of pieces of image data representing a display object image with different resolutions, each of the different resolutions being defined by a respective number of image tiles;
determining a layer and a region used for rendering an image to be displayed in each of a plurality of viewports generated on a screen of a display device, the layer and the region being included in hierarchical data;
reading data of the determined layer and the determined region from a storage device, rendering the image of each of the plurality of viewports using the data, and making the image of each of the plurality of viewports displayed on the display device;
independently updating the layer and the region used for rendering the image to be displayed in each of the plurality of viewports according to an input display region moving request signal, such that a substantially constant burden on the image processing device is maintained, irrespective of changes made in accordance with the input display region moving request signal, by maintaining substantially constant a total number of the image tiles being used to render the image; and
reading data of the layer and the region after the update from the storage device, and updating the image of each of the plurality of viewports using the data.

* * * * *